Oct. 30, 1928.
W. K. WHITE
RECEPTACLE
Filed June 10, 1927
1,689,217
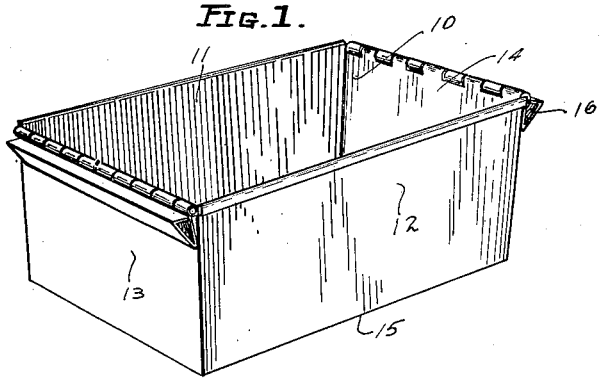
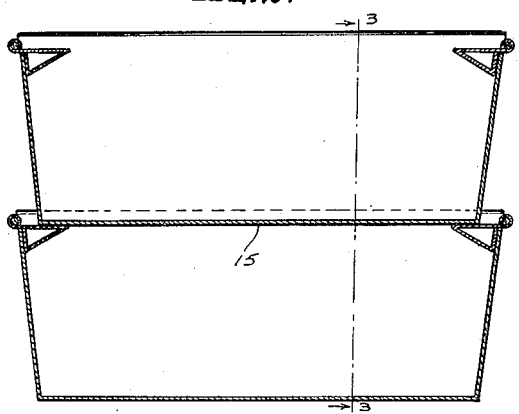
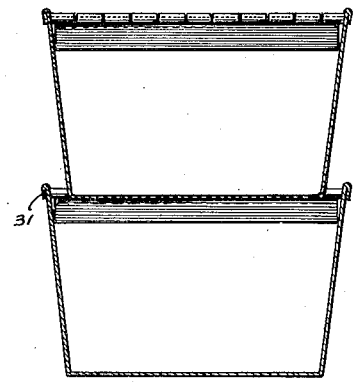
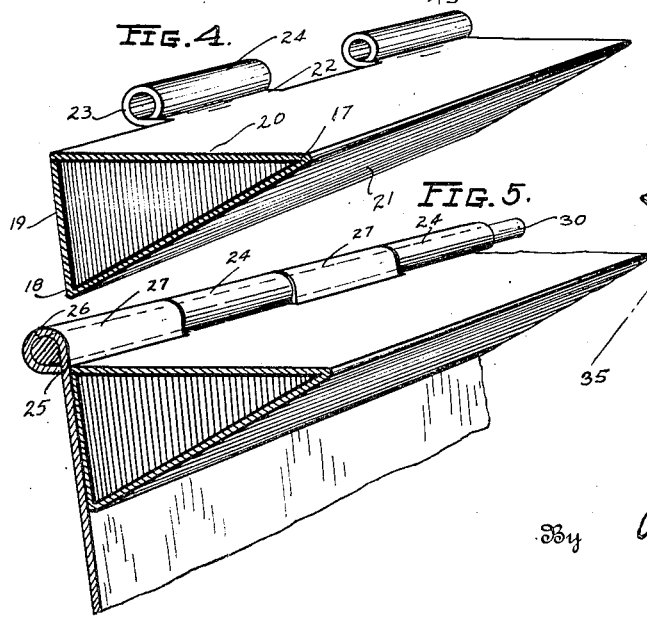
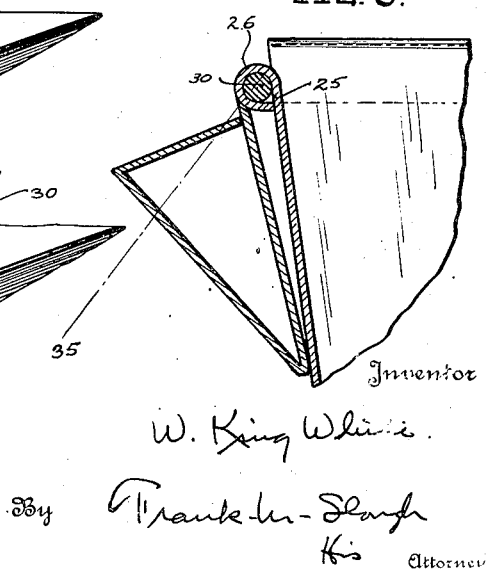

Patented Oct. 30, 1928.

1,689,217

UNITED STATES PATENT OFFICE.

WILLIAM KING WHITE, OF CLEVELAND, OHIO.

RECEPTACLE.

Application filed June 10, 1927. Serial No. 197,849.

My invention relates to containers and the like and more particularly it relates to an improved combined nesting and handle or bail attachment therefor.

An object of my invention resides in the provision of combined bail and stacking members for containers and the like and thus a plurality of nestable containers equipped with such a device may be stacked or nested in a minimum of space without the possibility of sticking together when so stacked or nested.

Another object of my invention resides in the provision of an improved bail or handle member for containers so disposed thereon that handling the same is facilitated in a natural manner, with minimum manual effort.

Another object of my invention is to provide an improved bail and nesting attachment for containers and thus when the attachment is rotated to a position exterior of the container, it may be readily handled and carried and which may provide a nesting shelf to facilitate stacking of a plurality of containers, when rotated to a position within the container.

Another object of my invention resides in the provision of an improved nesting and bail member for containers which is durable and simple in construction, and which is economical to produce.

These and other objects of my invention and the invention itself will become apparent from reference to the following description of an embodiment thereof, and in which description reference will be had to the accompanying drawings forming a part of this specification.

Referring to the drawings:

Fig. 1 is a perspective view of a container embodying my invention, illustrating one of the positions thereof in use;

Fig. 2 is a vertical sectional view to two containers, each embodying my invention, illustrating another position thereof in use;

Fig. 3 is a transverse sectional view taken on the line 3—3 of Fig. 2;

Figs. 4 and 5 are fragmentary perspective views of my invention, the views being enlarged over the foregoing views for purposes of illustration, the former being shown detached from a container while the latter is shown attached to a container; and Fig. 6 is a fragmentary sectional view of a container embodying my invention in transverse section.

Referring to all the figures of the drawings, in all of which like parts are designated by like reference characters, at 10, I show a container, such as a sheet metal basket shaped container, having inclined side walls 11 and 12 and inclined end walls 13 and 14 joined at their ends and to a base 15 to form a rectangular container, being open at its top portion.

To the end walls 13 and 14 of such a container, I attach my invention, preferably comprising a pair of bails or handles, and nesting or stacking member 16, preferably formed of a sheet of metallic material and folded at 17 and 18 rendering it triangular in form in transverse section and having flat elongated side walls 19, 20 and 21.

The wall 20 of the member 16 is prov ded with a plurality of laterally extending fingers 22 which may be looped at 23 to form a plurality of offset axially aligned tubular portions 24 carried by the member 16 and projected towards the upper edge of the end walls of the container. The end walls of the container are also provided with a plurality of upwardly extending fingers 25 which may be looped at 26 to form a plurality of tubular portions 27 and co-axially aligned therewith. A heavy wire rod 30 is telescoped into the aligned tubular portions to provide a hinged joint for the members 16 and the end walls of the container. Means may be employed for holding the rods from accidental disengagement with the tubular portions, such as by upsetting the ends of the rods.

The side walls of the container are preferably higher than the end walls and are reversely turned at 31 to provide a reenforcing bead. Thus, when a plurality of containers are nested or stacked in superposed relation, these high side walls will limit sidewise movement of the containers.

In use, in handling the containers, the members 16 may be rotated on their hinges into the position shown in Figs. 1 to 6, in which position the same may be employed as a handle, the member being disposed exterior of the container side walls with the folded portion 17 thereof engaging the exterior surface of the side walls a substantial distance below the pivot or hinges and positioned closer to each other than are the hinges. Thus a grip on the outer surfaces 21 of the members 16 will exert a force tending to lift the container in the direction of the line 35 and thus the member will not be accidentally rotated on their hinges. The container dimensions are preferably 21 inches in length at the top and 19 inches at the base, 11 inches in width at its base and 12 inches in width at the top, and the height of the same is 7½ inches from the shelf to the bottom and 8 inches from side wall beads to the bottom, these dimensions have been found to be advantageous in handling when equipped with my invention.

The length of the container is preferably greater than the width of the shoulders of a person handling the same and thus the pull on these members when the container is lifted will be inwardly substantially on the line 35 and thus the members will not be accidentally rotated on their hinges during such lifting or otherwise handling the container.

Referring to Figs. 2, 3 and 5, wherein I illustrate a second position of the members 16, in use, depicting the same in a nesting or stacking position and wherein the members have been rotated on their pivots or hinges to a position projecting into the interior of the walls of the containers. In this position the walls 20 thereof engage the inner surfaces of the end walls and lies flat against the same. The end walls 21 of the member 16 now assume a horizontal position both on an even plane with each other and thus provide a shelf disposed on a plane below the bead of the side walls.

A plurality of like containers may be equipped with my invention and nested or stacked in the manner shown in Figs. 2 and 3.

Having thus described my invention in certain specific embodiment I am aware that numerous and extensive departures may be made from the embodiment herein illustrated and described without departing from the spirit of my invention.

I claim:

1. In a container, a rectangular bottom wall therefor, a pair of end and a pair of side walls extending upwardly from the bottom wall, a pair of handles connected to the upper edge portions of opposite end walls and adapted to be rotated thereon to alternative positions within and without the container, each of said handles comprising portions extending parallel to said end walls, and adapted to engage the end walls in both alternative positions, said portions having three sides, one of said sides adapted to engage by a portion adjacent its lower edge the outer surface of the end wall when the handle is disposed in position exteriorly of the container, said side forming a surface for engaging another container by its bottom wall when the handle is rotated to its interiorally disposed alternative position, to support the other container.

2. In a container, a rectangular bottom wall therefor, a pair of end and a pair of side walls extending upwardly from the bottom wall, a pair of handles connected to the upper edge portions of opposite end walls and adapted to be rotated thereon to alternative positions within and without the container, each of said handles comprising portions extending parallel to said end walls, and adapted to engage the end walls in both alternative positions, said portions having three sides, one of said sides adapted to engage by a portion adjacent its lower edge the outer surface of the end wall when the handle is disposed in position exteriorly of the container, and an adjacent side adapted for engagement by the hands of a person supporting the container by its handles, said adjacent side extending in an outwardly upwardly direction from its associated container end wall.

3. In a container, a rectangular bottom wall therefor, a pair of end and a pair of side walls extending upwardly from the bottom wall, a pair of handles connected to the upper edge portions of opposite end walls and adapted to be rotated thereon to alternative positions within and without the container, each of said handles comprising portions extending parallel to said end walls, and adapted to engage the end walls in both alternative positions, said portions having three sides, one of said sides adapted to engage by a portion adjacent its lower edge the outer surface of the end wall when the handle is disposed in position exteriorly of the container, and an adjacent side adapted to engage the inner surface of the said end wall when the handle is rotated to its position within the container, said end wall then preventing further rotation of the handle whereby said first end wall may support the load of another container tiered on the first container.

4. In a container, a rectangular bottom wall therefor, a pair of end and a pair of side walls extending upwardly from the bottom wall, a pair of handles connected to the upper edge portions of opposite end walls and adapted to be rotated thereon to alternative positions within and without the container, each of said handles comprising portions extending parallel to said end walls, and adapted to engage the end walls in both alternative positions, said portions having three sides, one of said sides adapted to engage by a portion adjacent its lower edge the outer surface of the end wall when the handle is disposed in position exteriorly of the container, and an adjacent side adapted for engagement by the hands of a person supporting the container by its handles, said adjacent side extending in an outwardly upwardly direction from its associated container end wall, the angle of obliquity of the said adjacent side relative to the end wall and the axis of rotation of the handle and the direction of the lifting movement when the adjacent side wall is manually engaged to lift the container being such that the handles will tend to rotate toward the outer surface of the container, being restrained from inward movement thereby.

5. In a container, a rectangular bottom wall therefor, a pair of end and a pair of side walls extending upwardly from the bottom wall, a pair of handles connected to the upper edge portions of opposite end walls and adapted to be rotated thereon to alternative positions within and without the container, each of said handles comprising portions extending parallel to said end walls, and adapted to engage the end walls in both alternative positions, said portions having three sides, one of said sides adapted to engage by a portion adjacent its lower edge the outer surface of the end wall when the handle is disposed in position exteriorally of the container, said side forming a surface for engaging another container by its bottom wall when the handle is rotated to its interiorally disposed alternative position, to support the other container, said side surface being so disposed relative to the axis of rotation of the handle that it will then be disposed below the upper edges of the side walls.

6. In a container, a rectangular bottom wall therefor, a pair of end and a pair of side walls extending upwardly from the bottom wall, a pair of handles connected to the upper edge portions of opposite end walls and adapted to be rotated thereon to alternative positions within and without the container, each of said handles comprising portions extending parallel to said end walls, and adapted to engage the end walls in both alternative positions, said portions being in the approximate form of a tube of triangular cross-section.

7. In a container, a rectangular bottom wall therefor, a pair of end and a pair of side walls extending upwardly from the bottom wall, a pair of handles connected to the upper edge portions of opposite end walls and adapted to be rotated thereon to alternative positions within and without the container, each of said handles comprising portions extending parallel to said end walls, and adapted to engage the end walls in both alternative positions, said portions being in the approximate form of a tube of triangular cross-section, said tubular portions being offset relative to the axis of rotation of the handles so that when disposed within the container all portions of the uppermost wall thereof will be disposed below said axis, whereby a container supported on the handles when in such position will be prevented by edges of the container walls from shifting laterally.

In testimony whereof I hereunto affix my signature this 8th day of June, 1927.

W. KING WHITE.